United States Patent [19]

Jebe et al.

[11] Patent Number: 5,014,431
[45] Date of Patent: May 14, 1991

[54] TOOL FOR HANDLING DISPOSABLE FOOD CONTAINING BAGS

[75] Inventors: Arnim B. Jebe, 67 Blue Spruce Cir., Weston, Conn. 06883; Frank D. Flagg, Westport, Conn.; Harold W. Danser, III, New Canaan, Conn.; William Kobernus, New Milford, Conn.; George Schick, Easton, Conn.

[73] Assignee: Arnim B. Jebe, Weston, Conn.

[21] Appl. No.: 384,311

[22] Filed: Jul. 24, 1989

[51] Int. Cl.5 .................... B25F 3/00; B26B 13/00; D06M 11/26
[52] U.S. Cl. .................... 30/124; 30/250; 7/132
[58] Field of Search .............. 20/124, 125, 131, 134; 7/129, 132, 134, 135

[56] References Cited

U.S. PATENT DOCUMENTS

| 1,693,974 | 12/1928 | Bienstock | 248/95 |
| 3,336,668 | 8/1967 | Groom | 30/250 |
| 3,774,251 | 11/1973 | Pellman | 7/132 |
| 3,819,009 | 6/1974 | Scales | 222/95 |
| 4,393,757 | 7/1983 | Welsh | 99/369 |
| 4,412,482 | 11/1983 | Janssen | 99/403 |
| 4,423,551 | 1/1984 | Chmela et al. | 30/124 |
| 4,513,501 | 4/1985 | Lee | 30/124 |
| 4,716,886 | 1/1988 | Schulman et al. | 30/124 |
| 4,753,469 | 6/1988 | Hiscott | 294/1.1 |
| 4,831,734 | 5/1989 | De Ruyter et al. | 30/124 |

Primary Examiner—Douglas D. Watts
Assistant Examiner—Paul M. Heyrana, Sr.
Attorney, Agent, or Firm—St. Onge Steward Johnston & Reens

[57] ABSTRACT

A kitchen tool for handling disposable food containing bags in described. The took includes first and second pivotally-connected members which have bag-gripping edges between which a bag is gripped. At least one such edge and as described both bag-gripping edges have slots through which a knife can move to cut a bag as it is held. A bag cutter is mounted on one member to cut a bag along the slots. A lock mechanism is described with which the members cannot be opened unless the cutter is moved to a safe position.

6 Claims, 4 Drawing Sheets

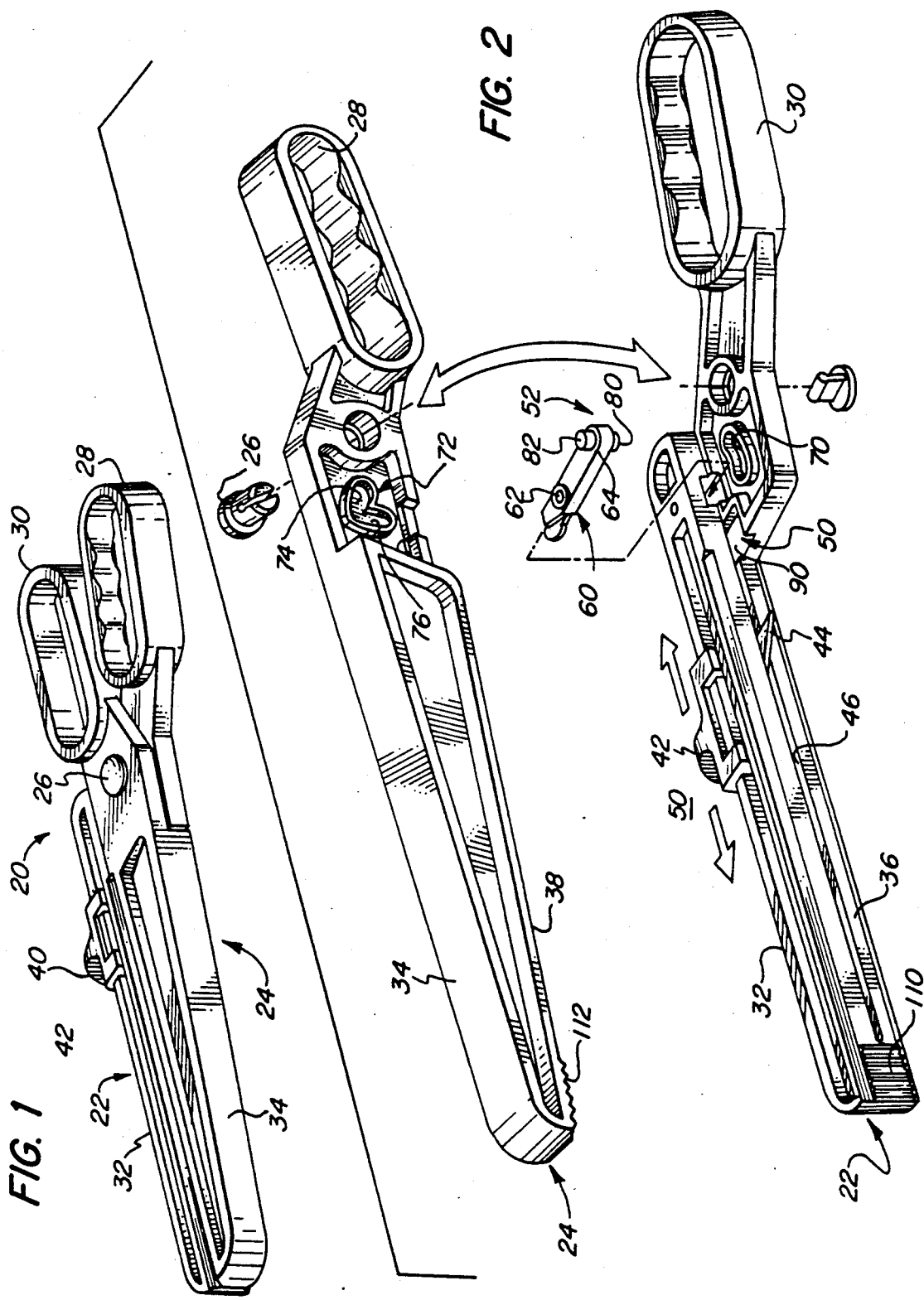

TOOL FOR HANDLING DISPOSABLE FOOD CONTAINING BAGS

Field of the Invention

This invention generally relates to a bag-handling tool and more specifically to a kitchen tool for handling disposable hot food bags.

BACKGROUND OF THE INVENTION

Disposable cooking bags in which food can be cooked are well known, see for example, U.S. Pat. Nos. 3,819,089 and 4,412,482. Devices for holding or manipulating hot foods have been proposed, starting for example with the utensil described in U.S. Pat. No. 1,693,974, the food pouch holder in U.S. Pat. No. 4,393,757 and the food bag holder in U.S. Pat. No. 4,753,469.

A problem associated with these utensils is that a hot food bag needs to be manipulated in such a manner that, after the food inside is cooked, the bag must be opened by cutting it and then turned upside down to dispense the hot cooked food. This either requires excessive manual handling of the hot bag, an uncomfortable thing to do, or holding the hot bag with a clamp to then sever a part of the bag with a scissor to form a discharge opening.

SUMMARY OF THE INVENTION

With a kitchen tool in accordance with the invention handling of a hot food bag becomes simpler and safer. This is achieved by providing in one embodiment first and second bag-gripping members that are so connected to each other that the tool can be held by one hand. Each member has elongate tongs with bag-gripping edges that face each other to hold a bag between them when the tongs are moved to a closed position. A bag cutter is provided and is so located as to operate along the bag-gripping edges and sever a bag into separate portions. One portion of the bag typically contains the food while the other portion is to be removed to leave a bag opening. Both bag portions are held by the bag-gripping edges after severing while enabling removal of the other bag portion as the food-containing portion is still held in place. The remaining food-containing bag portion may then be inverted to dispense the hot food.

With a kitchen tool in accordance with the invention dispensing of the food inside the opened bag can be advantageously facilitated by using the elongate bag-gripping edges to squeeze the food through the opening while the bag is withdrawn from between the bag-gripping edges.

The severing of a bag can be done with a cutter that is mounted to move relative to the bag-gripping edges or with a cutter that extends along the latter edges and is an integral part thereof. As described herein for one embodiment of the invention, a movable knife is mounted to one of the tongs and extends through slots in the bag-gripping edges. When the knife is moved from a home position along the slots, the bag is severed into two portions, both of which are retained by the bag-gripping edges. One bag portion is pulled away to leave the other bag portion suspended between the bag-gripping edges for further handling.

The movable knife can be slidable to shear the bags or be a rotating blade that acts against an anvil along one of the edges to cut the bag.

A locking mechanism is employed whereby the tongs cannot be opened unless the movable knife is at a safe home position. In this manner, the safety of the tool is enhanced.

In another form of the invention a tool is provided with elongate bag gripping edges on separable tongs. At least one of the latter edges has an elongate slot through which a knife can be applied to cut a bag held between the bag gripping edges.

It is, therefore, an object of the invention to provide a convenient technique for handling a hot food containing bag. It is a further object of the invention to provide a kitchen tool with which a hot bag in which food is being cooked can be extracted from boiling water, slit open and the contents removed in a convenient manner.

These and other objects and advantages of the invention can be understood from the following description of a preferred embodiment as shown in the drawings.

BRIEF DESCRIPTION OF DRAWINGS

FIG. 1 is a perspective view of a bag handling tool in accordance with the invention;

FIG. 2 is a perspective exploded view of the various parts employed in the tool of FIG. 1;

Detailed Description of Drawings

Figure 3:
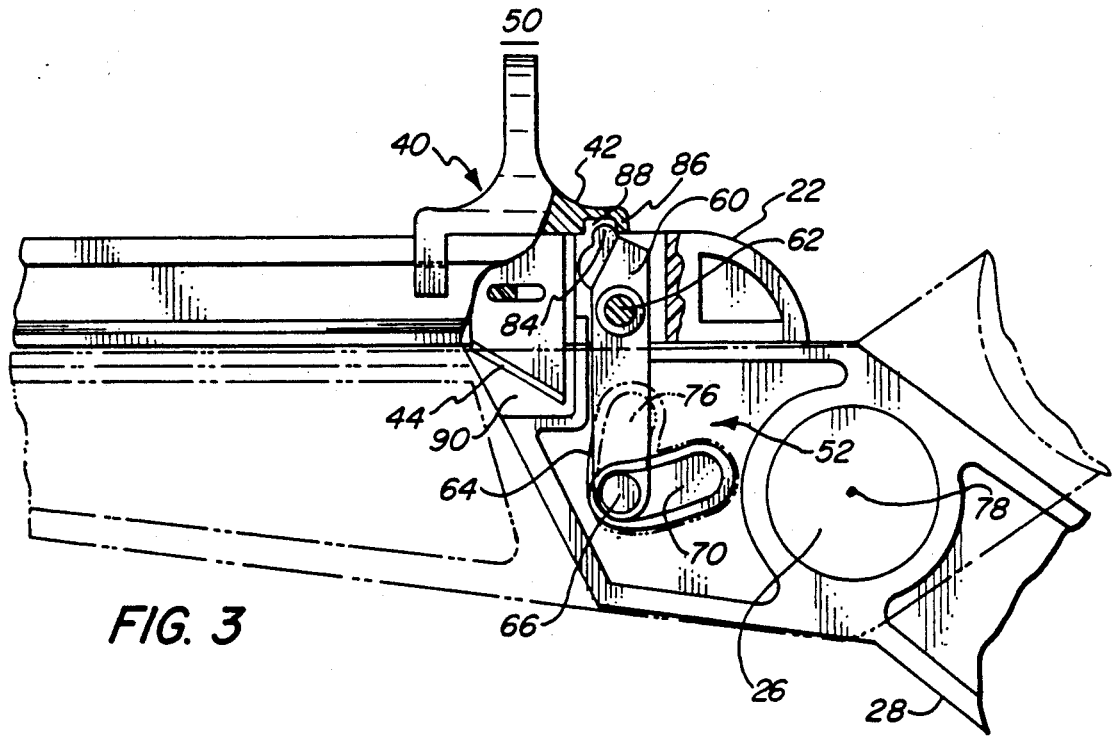
FIG. 3 is a partial plan broken away view of the bag handling tool of FIG. 1 to show its lock mechanism in a released position.

With reference to FIGS. 1 and 2, a tool 20 for use in a kitchen to assist in the handling of food-containing bags is shown. Tool 20 includes a pair of bag gripping members 22, 24 that are cross connected to each other in scissor fashion at a pivot 26. Members 22, 24 are provided with handles 28, 30 and elongate tongs 32, 34.

Tongs 32, 34 meet along elongate generally flat surfaced bag-gripping edges 36, 38 that face each other to hold a bag between them when the handles 28, 30 are in a closed bag-gripping position as shown in FIG. 1.

A bag cutter 40 is slidably mounted to member 22 and is formed with a slide 42 that is affixed to a knife 44. The knife 44 protrudes through a slot 46 generally centrally-located in the bag-gripping edge so as to cut a bag held between the bag-gripping edges 36, 38. Cutter 40 is moveable along tong 32 from a safe home position at 50 where a locking mechanism 52 is located.

The lock 52 serves to prevent separating of the tongs 32, 34 while the knife 44 is away, for example as at 54 in FIG. 2, from its safe position. The lock 52 is automatically actuated when knife 44 is moved away from its home position and is released when knife 44 is moved to its safe position.

Figure 4:
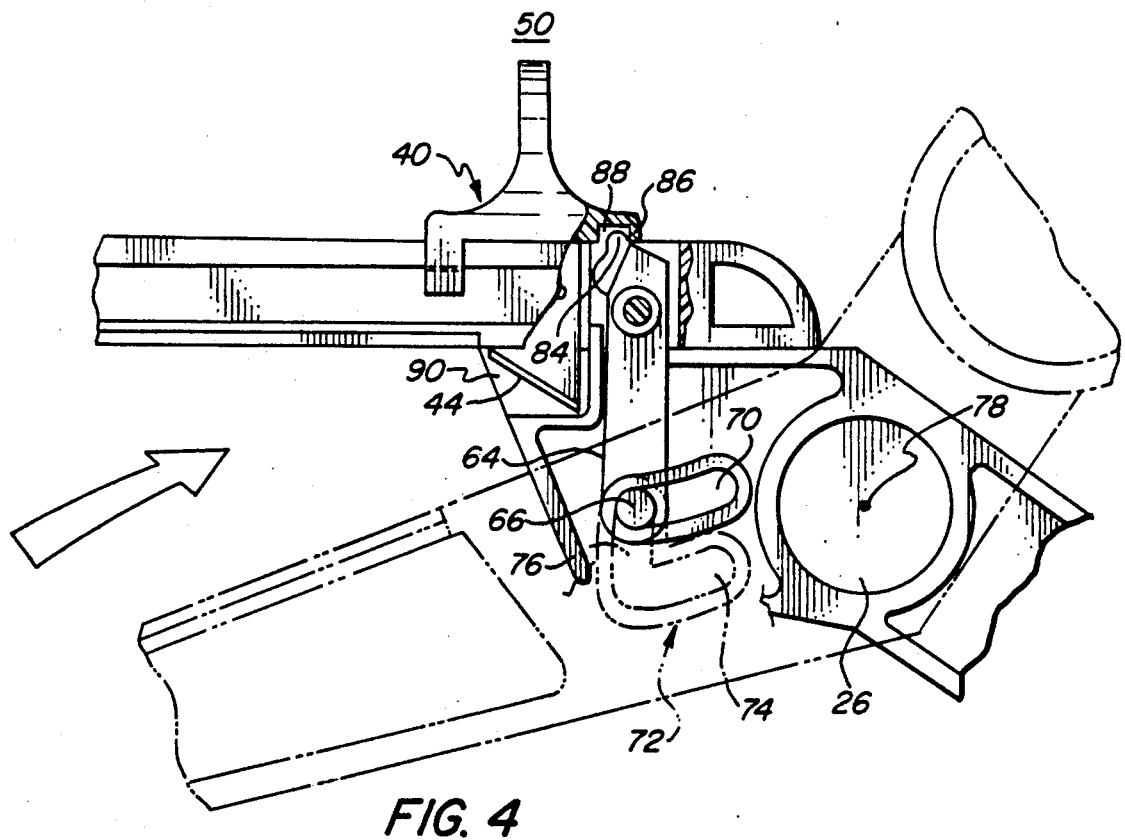
FIG. 4 is a partial plan broken away view as FIG. 3, but with the tool in its open position.
Figure 5:
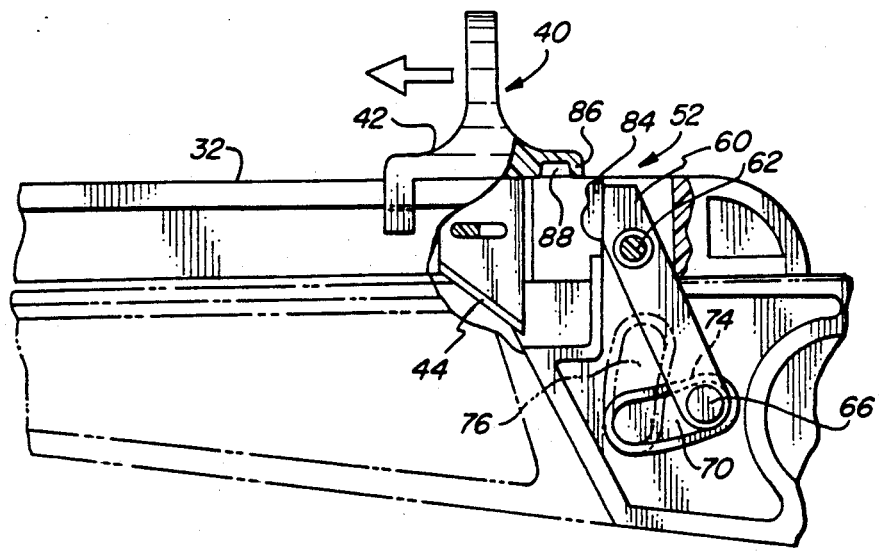
FIG. 5 is a partial plan broken away view as in FIG. 3, but with the lock mechanism in its locking position.

With reference to FIGS. 2 and 3-5, the lock 52 is formed with a latch 60 that is pivotally connected by a pin 62 to member 22 to which cutter 40 is slidably mounted. Latch 60 has one part 64 provided with a pin 66 that penetrates guides in the form of slots 70, 72 in members 22, 24 respectively. Guide slot 70 is curved to enable pin 66 to move from a release position as shown in FIG. 3 to a lock position as shown in FIG. 5. Slot 70 is, therefore, curved to accommodate the arcuate motion of pin 66 about an axis at the center of pin 62. The center of the radius of curvature of slot 70 is the axis of rotation of pin 62.

Guide slot 72 in member 24 has two distinct intersecting portions 74, 76. Guide slot portion 74 is like guide slot 70 in member 22 and is in alignment with it when members 22, 24 are closed as shown in FIGS. 3 and 5.

Slot portion 76 is curved to accommodate opening and closing of members 22, 24 and has, therefore, a curvature that accommodates the motion of pin 66 about the pivot 26. The center of the radius of curvature of slot portion 76 is the axis 78 around which pivot 26 rotates.

As shown in the view of FIG. 3, the slots 70 and 72 overlap with the pin 66 having ends 80, 82 (see FIG. 2) extending respectively into guide slots 70, 72 respectively. In the release position for lock 52 as shown in FIG. 3, pin 66 can slide along slot portion 76 while, after opening of the members 22, 24 as shown in FIG. 4, being unable to move along slot 70.

Correspondingly, after the cutter 40 is moved away from its home position 50 as shown in FIG. 5, the latch 60 is pivoted so that pin 66 now can only move along a path as defined by overlapping guide slot 70 and guide slot portion 74 while being prevented from moving along slot 76.

Latch 60 is made responsive to the motions of cutter 40 by use of a rounded protruding latch element 84 that is in the travel path of the slide 42 of cutter 40. The latter has an edge 86 whose motion to the home position 50 in FIG. 3 initially encounters protruding latch element 84 and forces latch 60 to pivot clockwise in the view of FIG. 3.

Protruding latch element 84 is sized sufficiently large so as to enable edge 86 to pivot latch 60, yet sufficiently small so that edge 86 can be moved over element 84 and snap seat it in a detent recess 88. Correspondingly, when cutter 40 is moved away from its home position, the member 60 is initially pivoted counterclockwise as shown in the view of FIG. 5 to a lock position.

Hence, as cutter 40 is moved to cut a bag, the lock 52 is automatically engaged to prevent accidental opening. This facilitates holding of a bag and a safe handling of the knife 44. When the cutter 40 is moved to its home position 50 knife 44 is enclosed inside a recess 90 formed between members 22, 24, so that these may then be safely opened.

Figure 6:
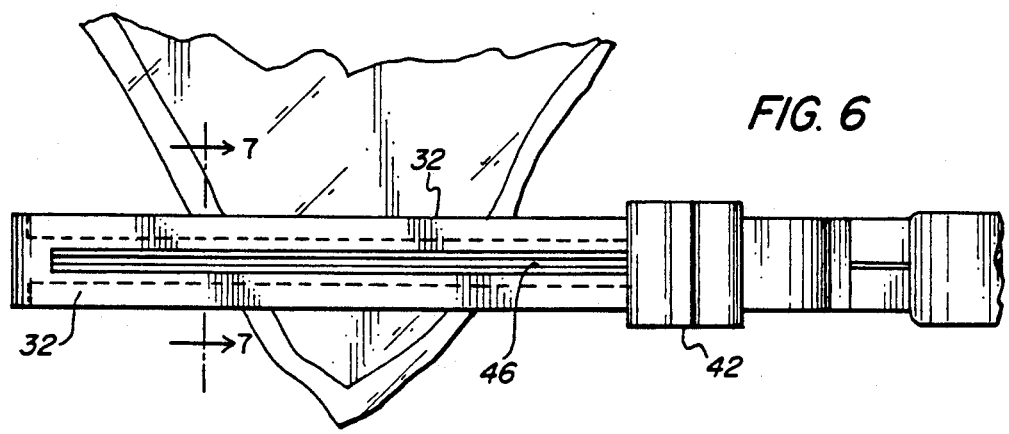
FIG. 6 is an edge view of the tool of FIG. 1 prior to severing a bag.
Figure 7:
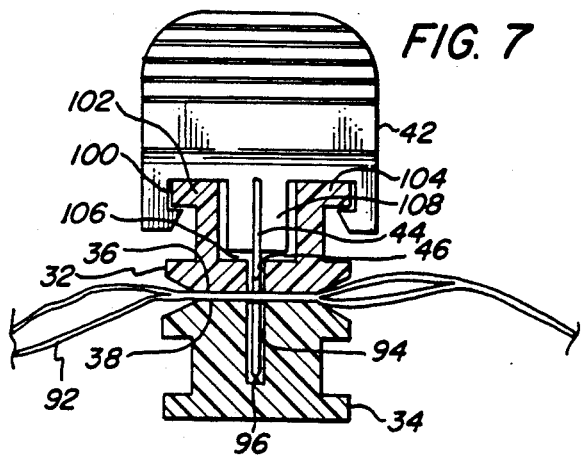
FIG. 7 is a section view of the tool of FIG. 1 and a bag taken along the line 7—7 in FIG. 6.

As shown in the views of FIGS. 6 and 7, cutter 40 moves along slot 46 in tong 32 to sever a bag 92. Knife 44 extends through slot 46 into an aligned slot 94 in the bag-gripping edge 38 of tong 34. Slots 46, 94 accommodate sliding motion of knife 44 yet are sufficiently narrow to provide a convenient severing of bag 92 while both the severed bag part and the food containing bag part remain held between tongs 32, 34.

It can be appreciated that with reference to the view in FIG. 7, a bag-handling tool can be provided in accordance with the invention whereby the knife 44 can be a rotating blade or where the cutter 40 is not an integral part of the tool For example, a bag-handling tool can have just one slot 46 or both slots such as 46 and 94. In such case a bag 92 that is held by the tool can be severed by applying a common kitchen knife to penetrate either slot 46 alone or both slots 46 and 94 and then moving the knife along the slots. The knife can be acting against an anvil such as provided by the bottom 96 of slot 94 or the knife can extend all the way through a slot 96 in tong 34 when slot 96 is made like slot 46 in tong 32.

Slide 40 is formed with a suitable groove 100 that fits in dove-tail fashion around correspondingly sized and shaped edges 102, 104 of tong 32. An enlarged elongate recess 106 is formed in tong 32 to freely receive a depending knife retaining portion 108 of slide 42.

The end parts 110, 112 (see FIG. 2) of the bag gripping edges 36, 38 of tongs 32, 34 are suitably grooved to facilitate picking a bag of hot food out of the boiling water of a cooking pot.

Figure 8:
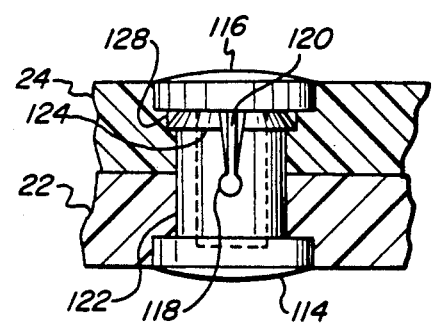
FIG. 8 is a sectional view of a pivot employed in the tool of FIG. 1.
Figure 9:
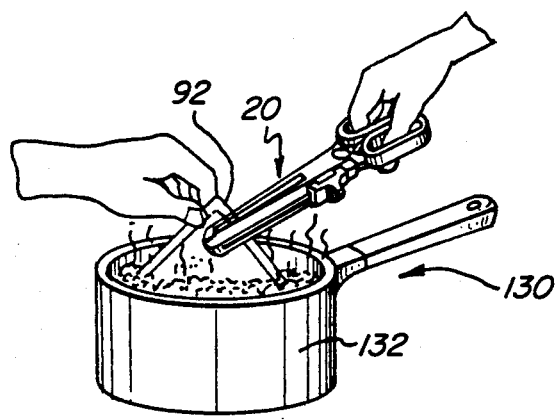
FIGS. 9–12 are perspective views of the tool of FIG. 1 in successive stages of use.

Pivot 26 is shown formed of a pair of mating cylindrical parts 114, 116 in FIGS. 2 and 8. Part 114 includes a female clamping recess 118 sized to receive a correspondingly-sized wedge 120 that prevents escape from aligned through-holes 122 in members 22, 24. A shoulder 124 on part 114 rests on the bottom end of a counter bore 128 in member 24.

The tool 20 and its various parts can be formed of suitable injecting molded plastic, though the knife can be made of metal.

FIGS. 9–12 illustrate a typical use of the tool 20 in accordance with the invention. A bag 92 containing food that has been boiled in the bag is removed at 130 in FIG. 9 with tool 20 from the boiling water in pot 132. At this time the hot food is at the lower part of bag 92 so that one can momentarily manually hold the bag in the free hand to position the bag properly in the tool 20.

Figure 10:
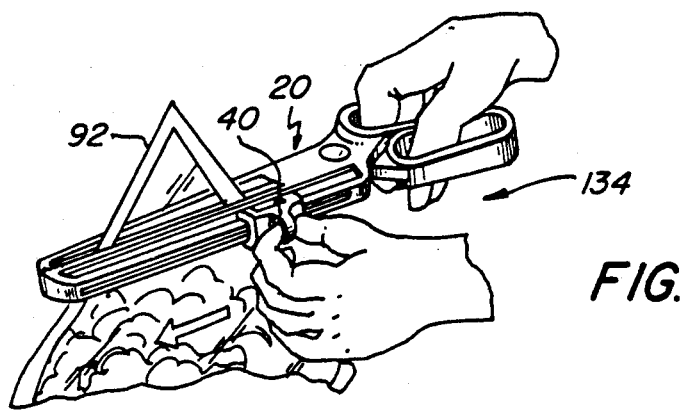
Figure 11:
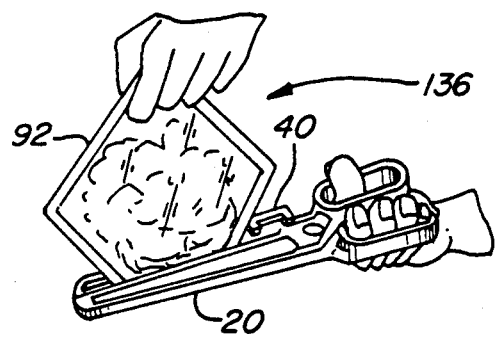
Figure 12:
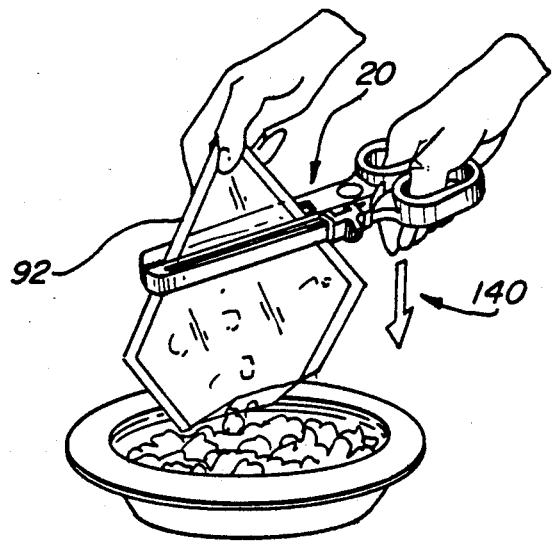

At 134 in FIG. 10 the cutter 40 is moved to sever the upper bag part. Since the bag-gripping edges frictionally engage bag 92, the cut part can be pulled away and discarded while the food containing bag part remains gripped between the lower portions of the bag gripping edges 36, 38. The bag can then be inverted as at 136 in FIG. 11 and the contents emptied on a plate (not shown). The bag can then be squeezed by using tool 20 as shown at 140 in FIG. 12 while pulling the bag through to empty the food from the bag.

Having thus described an illustrative embodiment for a food bag containing kitchen tool in accordance with the invention, its advantages can be appreciated. Variations of the embodiment can be made by one skilled in the art without departing from the scope of the invention.

What is claimed is:

1. A tool for handling disposable food containing bags in which the food is cooked, comprising:

first and second bag-gripping elements that are connected to each other at a pivot so as to form a manually-controllable hot bag handler, said elements having elongate tongs and having handles for opening and closing of the elongate tongs, said tongs having bag-gripping edges that face each other to hold a bag between them when the handles are moved towards a closed bag-gripping position, a bag cutter mounted on and operative along the bag-gripping edges so as to be able to sever a bag into separate portions, with one bag portion being held by first parts of bag-gripping edges that are to one side of the bag cutter and another bag portion being held by second parts of bag gripping edges edges that are on the other side of the bag cutter;

wherein the bag-gripping edges, when the handles are moved to a closed position, frictionally engage the bag so as to hold it while enabling a sliding removal of one bag portion that has been severed by the cutter from the bag while the other bag portion remains to be held by one of said parts of bag-gripping edges;

wherein the bag-gripping edges are further provided with elongate slots that are juxtaposed in alignment with each other when the tongs are moved to a bag-gripping position, said bag cutter being slidably mounted relative to said tongs and extending through one of said slots into the other slot to cut a bag held between the bag gripping edges; and wherein the cutter is slidably mounted to one of said tongs so as to operatively move from a home position along the elongate tone; and means pivotly affixed to said bag-gripping members at said pivot for preventing the first and second bag gripping members from being moved to an open position when the cutter is not at its home position.

2. A tool for handling disposable food containing bags in which the food is cooked, comprising:

first and second bag-gripping members that are movably connected to each other to jointly form a hot bag handler; said members having handles for enabling single hand manipulation and having longitudinally-extending elongate tongs; said tongs having bag-gripping edges that face each other to hand a bag between them when the handles are moved to a closed position, at least one of said bag-gripping edges having a slot sized to receive a knife to sever a bag while it is held between the tongs;

first and second guides respectively located in the first and second bag-gripping members; said guides being oriented so that they partially overlap, and a movable lock member movably coupling the first and second members to each other through said guides, said lock member having a portion located in the path of the knife and being movable to a lock position when the knife is moved into said slot to sever a bag.

3. The tool as claimed in claim 2 wherein both bag-gripping edges have slots that face each other and are in alignment when the handles are moved to a closed position so that a said knife may operatively extend through one said slot into the other slot to cut a bag.

4. The tool as claimed in claim 3 wherein said other slots has a bottom to form an anvil against which the knife can be moved to cut a bag.

5. A tool for handling disposable food containing bags in which the food is cooked, comprising:

first and second bag-gripping members that are movably connected to each other to jointly form a hot bag handler; said members having handles for enabling single hand manipulation and having longitudinally-extending elongate tongs; said tongs having generally flat-surfaced bag-gripping edges that face each other so as to frictionally hold a bag between them when the handles are moved to a closed position, at least one of said bag-gripping edges having a slot sized to receive a knife to sever a bag while it is held between the tongs with said bag-gripping edges frictionally holding a bag both above and below the slot to enable severed bag portions to be removably gripped between said members.

6. The tool as claimed in claim 5 wherein said first and second bag-gripping members are formed of injection molded plastic to facilitate gripping of a hot bag.

* * * * *